United States Patent
Hachiya et al.

(10) Patent No.: US 9,001,839 B2
(45) Date of Patent: Apr. 7, 2015

(54) COMMUNICATION CONTROL DEVICE AND METHOD

(71) Applicant: Fujitsu Limited, Kawasaki-shi, Kanagawa (JP)

(72) Inventors: Koji Hachiya, Miyaki (JP); Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 13/848,774

(22) Filed: Mar. 22, 2013

(65) Prior Publication Data

US 2013/0329744 A1     Dec. 12, 2013

(30) Foreign Application Priority Data

Jun. 11, 2012  (JP) ................................ 2012-132343

(51) Int. Cl.
*H04L 12/741*     (2013.01)
(52) U.S. Cl.
CPC .................... *H04L 45/745* (2013.01)
(58) Field of Classification Search
None
See application file for complete search history.

(56) References Cited

U.S. PATENT DOCUMENTS

| | | | | |
|---|---|---|---|---|
| 5,793,992 A | * | 8/1998 | Steele et al. .................. | 710/113 |
| 2008/0052304 A1 | * | 2/2008 | Raghunandan ............... | 707/101 |
| 2008/0186970 A1 | * | 8/2008 | Wisener et al. ............... | 370/392 |
| 2010/0115185 A1 | * | 5/2010 | Ono et al. ..................... | 711/103 |
| 2012/0257506 A1 | * | 10/2012 | Bazlamacci et al. .......... | 370/235 |

FOREIGN PATENT DOCUMENTS

JP          11-68818          3/1999

* cited by examiner

*Primary Examiner* — Anh-Vu Ly
*Assistant Examiner* — Hashim Bhatti
(74) *Attorney, Agent, or Firm* — Staas & Halsey LLP

(57) ABSTRACT

A communication control device includes a storage unit configured to store source addresses and destination addresses of one or more frames, a determination unit configured to determine respective access proportions for types of accesses to the storage unit, in accordance with an empty state of the storage unit, the empty state being a proportion of the number of empty entries in the storage unit to the total number of entries, and a control unit configured to control whether to access the storage unit, based on the access proportions determined by the determination unit and proportions for accesses having been made to the storage unit.

5 Claims, 11 Drawing Sheets

181

| EMPTY ENTRY PROPORTION FOR MAC ADDRESS TABLE (%) | ACCESS PROPORTIONS FOR MAC ADDRESS TABLE (%) | | | |
|---|---|---|---|---|
| | (A) MAC DA RETRIEVAL | (B) MAC SA RETRIEVAL | (C) MAC LEARNING | (D) AGING |
| #0  0 | 92 | 5 | 0 | 3 |
| #1  0% < EMPTY ENTRY PROPORTION < 20% | 86 | 10 | 1 | 3 |
| #2  20% ≤ EMPTY ENTRY PROPORTION < 40% | 64 | 30 | 3 | 3 |
| #3  40% ≤ EMPTY ENTRY PROPORTION < 60% | 46 | 46 | 5 | 3 |
| #4  60% ≤ EMPTY ENTRY PROPORTION < 80% | 30 | 60 | 7 | 3 |
| #5  80% ≤ EMPTY ENTRY PROPORTION ≤ 100% | 10 | 78 | 9 | 3 |

| # | |
|---|---|
| #0 | ACCESS PROPORTIONS (EMPTY ENTRY PROPORTION = 0%) |
| #1 | ACCESS PROPORTIONS (0% < EMPTY ENTRY PROPORTION < 20%) |
| #2 | ACCESS PROPORTIONS (20% ≤ EMPTY ENTRY PROPORTION < 40%) |
| #3 | ACCESS PROPORTIONS (40% ≤ EMPTY ENTRY PROPORTION < 60%) |
| #4 | ACCESS PROPORTIONS (60% ≤ EMPTY ENTRY PROPORTION < 80%) |
| #5 | ACCESS PROPORTIONS (80% ≤ EMPTY ENTRY PROPORTION ≤ 100%) |

| (A) MAC DA RETRIEVAL | (B) MAC SA RETRIEVAL | (C) MAC LEARNING | (D) AGING |

| | EMPTY ENTRY PROPORTION FOR MAC ADDRESS TABLE (%) | ACCESS PROPORTIONS FOR MAC ADDRESS TABLE (%) | | | |
|---|---|---|---|---|---|
| | | (A) MAC DA RETRIEVAL | (B) MAC SA RETRIEVAL | (C) MAC LEARNING | (D) AGING |
| #0 | 0 | 92 | 5 | 0 | 3 |
| #1 | 0% < EMPTY ENTRY PROPORTION < 20% | 86 | 10 | 1 | 3 |
| #2 | 20% ≤ EMPTY ENTRY PROPORTION < 40% | 64 | 30 | 3 | 3 |
| #3 | 40% ≤ EMPTY ENTRY PROPORTION < 60% | 46 | 46 | 5 | 3 |
| #4 | 60% ≤ EMPTY ENTRY PROPORTION < 80% | 30 | 60 | 7 | 3 |
| #5 | 80% ≤ EMPTY ENTRY PROPORTION ≤ 100% | 10 | 78 | 9 | 3 |

FIG. 12A
FIG. 12B
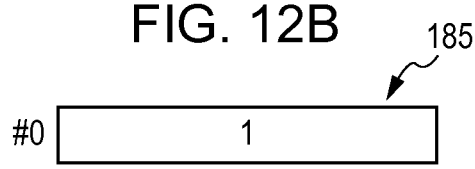
FIG. 13A
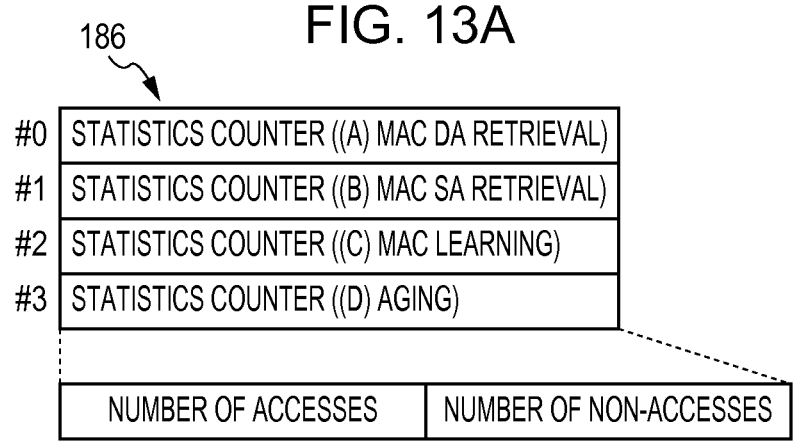
FIG. 13B
| | | | |
|---|---|---|---|
| #0 | 3000 | 5000 | (A) MAC DA RETRIEVAL |
| #1 | 8000 | 1000 | (B) MAC SA RETRIEVAL |
| #2 | 400 | 200 | (C) MAC LEARNING |
| #3 | 200 | 100 | (D) AGING |

COMMUNICATION CONTROL DEVICE AND METHOD

CROSS-REFERENCE TO RELATED APPLICATION

This application is based upon and claims the benefit of priority of the prior Japanese Patent Application No. 2012-132343, filed on Jun. 11, 2012, the entire contents of which are incorporated herein by reference.

FIELD

The embodiments discussed herein are related to a communication control device and a communication control method.

BACKGROUND

When a frame is transmitted over a network, currently, a bridge device is used which determines a transmission port for the frame and forwards it, on the basis of information regarding the data link layer. In order to fulfill this function, a bridge device has an updatable MAC (media access control) address table in which MAC addresses of other communication devices are related to corresponding port identifiers by, for example, an interface (IF) card. By referring to this MAC address table, the bridge device determines whether to forward or register a received frame, or selects a destination thereof when forwarding the frame. The bridge device mainly accesses the MAC address table when performing the following four processes: (A) the retrieval of a MAC destination address (MAC DA) upon transmission of a frame; (B) the retrieval of a MAC source address (MAC SA) upon reception of a frame; (C) the MAC learning (the registration of frame information); and (D) aging (the deletion of frame information). Hereinafter, the processes (A) to (D) are referred to as "access types (A) to (D)", respectively.

Japanese Laid-open Patent Publication No. 11-68818 is an example of the related art.

SUMMARY

According to an aspect of the invention, a communication control device includes: a storage unit configured to store source addresses and destination addresses of one or more frames; a determination unit configured to determine respective access proportions for types of accesses to the storage unit, in accordance with an empty state of the storage unit, the empty state being a proportion of the number of empty entries in the storage unit to the total number of entries; and a control unit configured to control whether to access the storage unit, based on the access proportions determined by the determination unit and proportions for accesses having been made to the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a view illustrating a configuration of an access proportion setting table in the bridge device;

FIG. 4B is a view illustrating an example of data stored in the access proportion setting table;

FIG. 12A is a view illustrating a configuration of a statistics management table in the bridge device;

FIG. 12B is a view illustrating an example of data stored in the statistics management table;

FIG. 13A is a view illustrating a configuration of a statistical information table in the bridge device;

FIG. 13B is a view illustrating an example of data stored in the statistical information table;

DESCRIPTION OF EMBODIMENTS

The recently increasing frame transmission rates have boosted a performance requested for bridge devices. To be specific, a bridge device is requested to perform the processes of (A) the MAC DA retrieval, (B) the MAC SA retrieval, and (C) the MAC learning, every time it transmits or receives a frame. When these processes are performed, there are cases where the performance of the bridge device fails to keep pace with the input rate of frames. In this case, the bridge device may not sufficiently fulfill the function of transmitting the frames at a high rate with a high quality. Specifically, as the number of frames to be stored in a bridge device is increased, the number of accesses to the MAC address table is also increased. In other words, as the processes (A) to (D) are performed more frequently, a higher performance is requested for a bridge device. Moreover, since the MAC address table is stored in the memory of a bridge device, as the number of accesses to the MAC address table is increased, a higher performance is requested for the memory. Thus, increasing the number of accesses to the memory, as a result of the increasing frame rate, makes it difficult for the memory to ensure such a requested high performance and causes a cost increase, high power consumption, and high heat generation of the memory.

Hereinafter, a detailed description will be given of first and second embodiments of a communication control device and a communication control method, with reference to the accompanying drawings. Note that the embodiments that will be described below are simply examples, and are not intended to limit the communication control device and method.

First Embodiment

Figure 1:
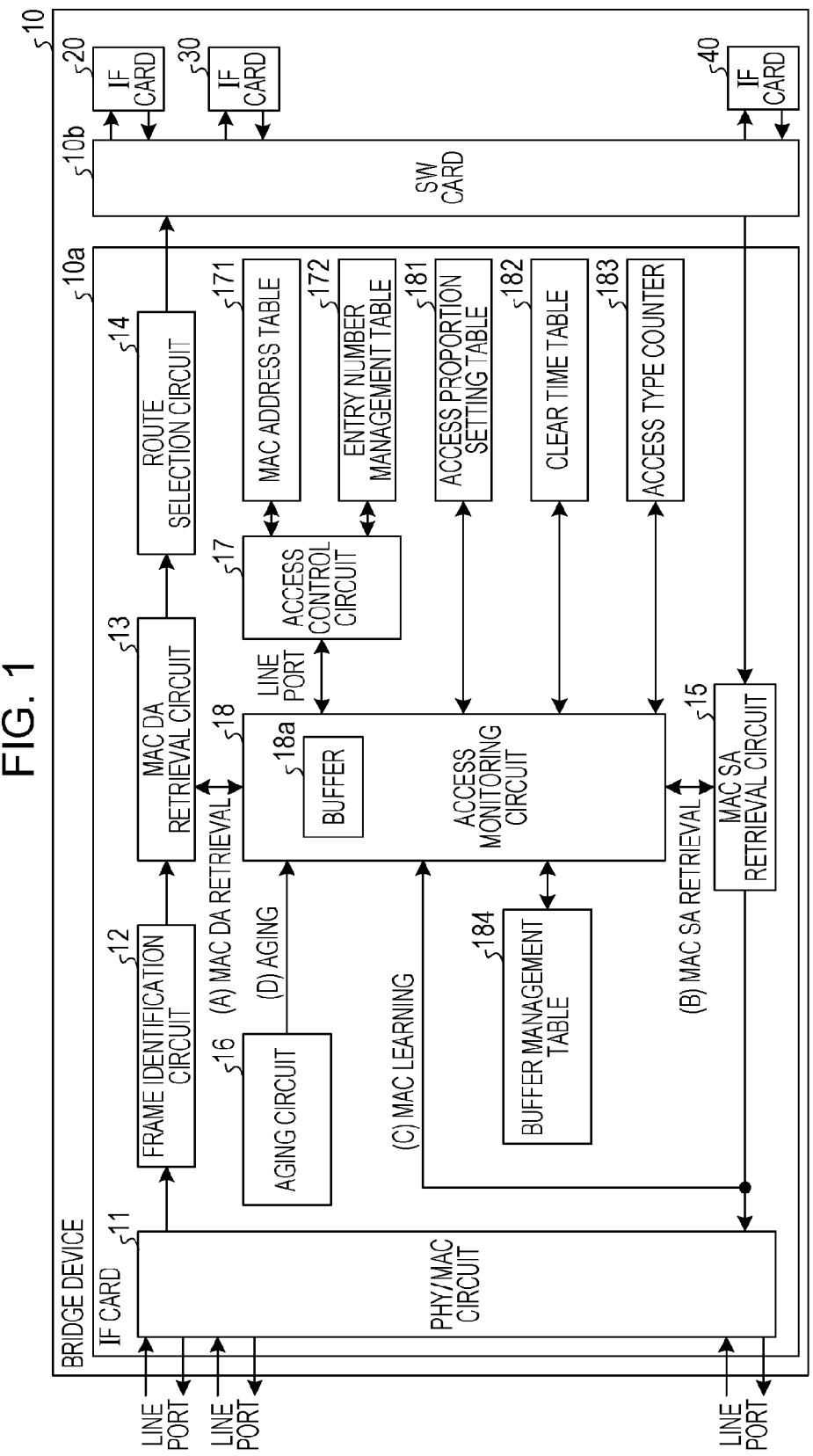
FIG. 1 is a block diagram illustrating a configuration of a bridge device according to a first embodiment.

First, a description will be given of a configuration of a bridge device according to a first embodiment. FIG. 1 is a block diagram illustrating a configuration of a bridge device 10 according to the first embodiment. As illustrated in FIG. 1, the bridge device 10 includes an interface (IF) card 10a and a switch (SW) card 10b, and is connected to IF cards 20, 30 and 40 through the SW card 10b. The bridge device 10 includes a physical/media access control (PHY/MAC) circuit 11, a frame identification circuit 12, a MAC DA retrieval circuit 13, a route selection circuit 14, a MAC SA retrieval circuit 15, an aging circuit 16, an access control circuit 17, and an access monitoring circuit 18. These components are connected such that a signal or data is input to the bridge device 1 and output therefrom in a single direction or two directions.

The PHY/MAC circuit 11 receives frames from line ports, and outputs them to the frame identification circuit 12. In addition, the PHY/MAC circuit 11 transmits frames whose MAC addresses are determined to have already been learned or not yet learned, from the IF card 10a to the line ports. The frame identification circuit 12 refers to a header of a frame received from the PHY/MAC circuit 11 to identify the MAC DA and MAC SA of this frame. The MAC DA retrieval circuit 13 retrieves a MAC DA from a MAC address table 171 through the access monitoring circuit 18 and the access control circuit 17 that will be described later, on the basis of the identification result of the frame identification circuit 12.

The route selection circuit 14 determines a destination and transmission route of the frame, if information (for example, destination information) on a frame to be transmitted is registered in the MAC address table 171. This frame is transferred to one of the IF cards 20, 30 and 40 which is determined as a destination, through the SW card 10b in a unicast or multicast manner. Otherwise, if information (for example, destination information) on a frame to be transmitted is not registered in the MAC address table 171, the route selection circuit 14 forwards the frame in a broadcast manner.

The MAC SA retrieval circuit 15 retrieves a MAC SA from the MAC address table 171 through the access monitoring circuit 18 and the access control circuit 17 that will be described later, on the basis of information (for example, source information) on a frame input from the SW card 10b to the IF card 10a. The aging circuit 16 manages an elapsed time until the information (for example, source information) on a frame is deleted from a memory, as an aging time. The aging circuit 16 deletes, from the MAC address table 171, information on a frame that has not received from the SW card 10b within the aging time (for example, 10 sec to 5 min). Along with the deletion, the aging circuit 16 decrements the number of entries in an entry number management table 172 by "one."

The access control circuit 17 subjects the MAC address table 171 to various processes, including the retrieval, registration, and deletion of an address, in accordance with an instruction from the access monitoring circuit 18. Furthermore, when giving the MAC address table 171 an instruction of registering or deleting information such as an address, the access control circuit 17 also gives the entry number management table 172 an instruction of incrementing or decrementing the number of entries. The access monitoring circuit 18 is provided with a buffer 18a that stores received frames. The access monitoring circuit 18 determines whether to cause the access control circuit 17 to access the MAC address table 171 and the entry number management table 172, by referring to various tables and a counter that will be described later. If the access monitoring circuit 18 determines to cause the access control circuit 17 to access these tables, the access monitoring circuit 18 gives the access control circuit 17 an instruction of, for example, retrieving, registering, or deleting an address.

Figure 2:
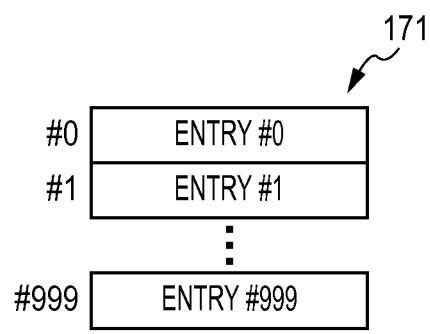
FIG. 2 is a view illustrating an example of data stored in a MAC address table in the bridge device.
Figure 3A:
FIG. 3A is a view illustrating a configuration of an entry number management table in the bridge device.
Figure 3B:
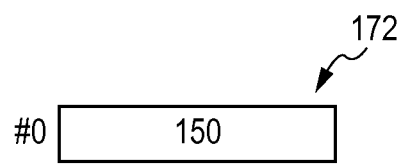
FIG. 3B is a view illustrating an example of data stored in the entry number management table.

FIG. 2 is a view illustrating an example of data stored in the MAC address table 171. For example, when the MAC address table 171 has 1000 entries, MAC addresses, each of which is data of 48 bits, are stored in the memory, in relation to identifiers "#0 to #999" of entries, as illustrated in FIG. 2. FIG. 3A is a view illustrating a configuration of an entry number management table 172. FIG. 3B is a view illustrating an example of data stored in an entry number management table 172. As illustrated in FIG. 3B, the entry number management table 172 retains the number (for example, "150") of MAC addresses presently registered in the MAC address table 171, as "the number of entries." Here, the proportion of the number of empty entries in the MAC address table 171 to the total number of entries therein is defined as an "empty entry proportion." For example, it is assumed that the entry number management table 172 stores 150 entries, and the total number of entries to be stored therein is "1000." In this example, the empty entry proportion in the MAC address table 171 is calculated to be 85% by using an equation ((1000−150)/1000)×100.

Referring to FIG. 4A, in the MAC address table 171, the proportion of each of the access types (A) to (D) to all the access types is defined as an "access proportion." FIG. 4A is a view illustrating a configuration of an access proportion setting table 181. FIG. 4B is a view illustrating an example of data stored in an access proportion setting table 181. As illustrated in FIG. 4B, in the access proportion setting table 181, the access proportion (%) for each access type is stored in relation to an empty entry proportion (%) for the MAC address table 171. Each access proportion is able to be preset and updated as appropriate by a network administrator or a carrier, on the basis of parameters including the bandwidth, communication rate, device specifications, and frame attribute (data length or type). For example, when communication is conducted over a wide area network, the administrator may update the access proportion of the MAC DA retrieval to a higher one, in order to increase the communication rate. Meanwhile, when the memory of the bridge device 10 has a large capacity regardless of whether it is empty or not, the bridge device 10 is able to reserve a data area in the memory which is large enough to store MAC addresses. Accordingly, the administrator may update the access proportion of the MAC learning to a higher one.

For example, it is assumed that the empty entry proportion is calculated to be "85%" in the MAC address table 171, as described above. Since 85% falls within a range of 80% to 100%, access proportions of 10%, 78%, 9% and 3% are employed as those of the access types (A), (B), (C) and (D), respectively. As illustrated in FIG. 4B, the access proportion setting table 181 is composed of multiple entries indicating empty entry proportions of the MAC address table 171. In this embodiment, since the six empty entry proportions are set, there are six entries in the MAC address table 171. However, there is no limitation on the number of entries. The number of entries may be any given number and may be changed.

Figure 5A:
FIG. 5A illustrates a configuration of a clear time table in the bridge device.
Figure 5B:
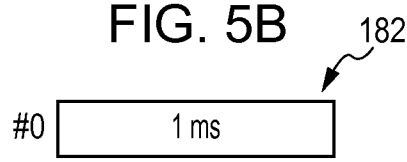
FIG. 5B is a view illustrating an example of data stored in the clear time table.

FIG. 5A is a view illustrating a configuration of a clear time table 182. FIG. 5B is a view illustrating an example of data stored in a clear time table 182. The clear time table 182 is referred to, in order to clear a counter of an access type counter 183 at regular intervals. As illustrated in FIG. 5B, the clear time table 182 retains information for one entry. In the clear time table 182, a time interval at which the above counter is cleared may be set to, for example, 1 ms. The maximum access performance for the MAC address table 171 is dependent on the hardware of the bridge device 10, and is indicated by, for example, "up to $15 \times 10^6$ accesses are possible per second." Accordingly, the bridge device 10 is able to calculate the maximum number of accesses to the MAC address table 171 within the clear time interval by referring to the clear time table 182.

For example, it is assumed that when the clear time interval is set to 1 ms in the access type counter 183, the maximum number of accesses to the MAC address table 171 is calculated to be 15 Mpps (packet per second). In this example, the memory of the bridge device 10 permits up to 15,000 accesses to the MAC address table 171 within 1 ms. However, there is no limitation on the clear time interval, and this clear time interval may be set to any given time, such as 1 ms, 100 ms, or 1 sec.

Figure 6A:
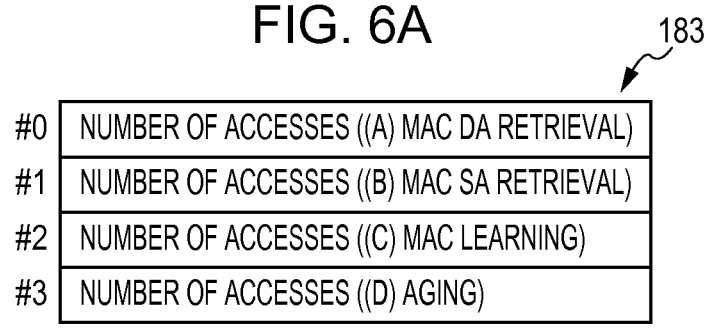
FIG. 6A illustrates a configuration of an access type counter in the bridge device.
Figure 6B:
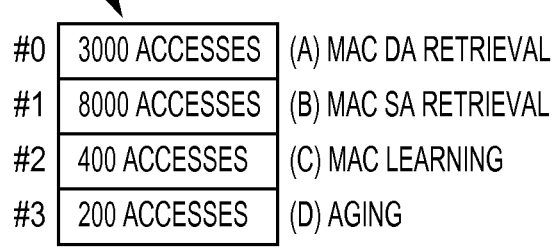
FIG. 6B is a view illustrating an example of data stored in the access type counter.

FIG. 6A illustrates a configuration of an access type counter 183. FIG. 6B is a view illustrating an example of data stored in an access type counter 183. As illustrated in FIG. 6B, the access type counter 183 has multiple (four) entries corresponding to the access types, and the access type counter 183 retains the number of accesses to the MAC address table 171 for each access type. The counter (the number of accesses) of the access type counter 183 is updated, every time there is an access to the MAC address table 171. This enables the access monitoring circuit 18 to continuously confirm the current, actual access proportion for each access type by referring to the counter.

The access control circuit 17 determines whether to access the MAC address table 171, on the basis of the result in which the access monitoring circuit 18 monitors the counter of the access type counter 183. Upon determination, the access monitoring circuit 18 refers to the access type counter 183. In this case, the counter of the access type counter 183 is subjected to leveling over each clear time interval by the clear time table 182. Accordingly, by referring to the counter of the access type counter 183, the access control circuit 17 is able to determine whether to access the MAC address table 171 on the basis of a numerical value reflecting the latest communication state. Consequently, it is possible for the bridge device 10 to reliably determine whether to access the MAC address table 171 for each access type.

Upon access determination as described above, the access proportion (see FIG. 4B) that has been preset in the MAC address table 171 is compared with the current, actual access proportion. In this case, the current, actual access proportion for the MAC address table 171 may be calculated by an equation (number of accesses for corresponding type/maximum access number therefor). For example, when an access for the access type (A) "MAC DA retrieval" is requested, the access monitoring circuit 18 calculates that a current, actual access proportion for the access type (A) is "20% (=(3000/15000)×100)." Referring to FIG. 4B again, the access proportion for the corresponding access type is set to 10% in the access proportion setting table 181. Since a relationship "current, actual access proportion (20%)>preset access proportion (10%)" is satisfied, the access monitoring circuit 18 prohibits the access control circuit 17 from accessing the MAC address table 171, in order to decrease the access proportion of the access type (A). Meanwhile, when an access for the access type (B) "MAC SA retrieval" is requested, the access monitoring circuit 18 calculates that a current, actual access proportion is "53% (=(8000/15000)×100)." Since the corresponding access proportion for the access type (B) is set to 78% in the access proportion setting table 181, the access to the MAC address table 171 is acceptable. Accordingly, the access monitoring circuit 18 permits the access control circuit 17 to access the MAC address table 171, and consequently the access control circuit 17 performs the process of the access type (B).

Likewise, when an access for the access type (C) MAC learning is requested, the access monitoring circuit 18 calculates that a current, actual access proportion for the access type (C) is "2.6% (=(400/15000)×100)." Referring to FIG. 4B again, the access proportion for the corresponding access type is set to 9% in the access proportion setting table 181. Accordingly, since the relationship "current, actual access proportion≤preset access proportion" is satisfied, the access control circuit 17 accesses the MAC address table 171, in order to compensate the shortage of the access proportion≤of access type (C). Meanwhile, when an access for the access type (D) "MAC learning" is requested, the access monitoring circuit 18 calculates that a current, actual access proportion is "1.3% (=(200/15000)×100)." Since the corresponding access proportion is set to 3% in the access proportion setting table 181, the current, actual access proportion does not reach the preset access proportion, and thus the access is acceptable. As a result, the access control circuit 17 accesses the MAC address table 171 in accordance with an instruction from the access monitoring circuit 18.

A buffer management table 184 is referred to, in order to determine whether to monitor the buffer 18a and to adjust the access proportions in a variable manner. By referring to the buffer management table 184, the access monitoring circuit 18 controls accesses to the MAC address table 171 in such a way that the number of accesses does not exceed a maximum acceptable number, even when the number of accesses to any of the access types (A) to (D) is suddenly increased. In this embodiment, the maximum number of frames stored in the buffer 18a is set to 100.

Figure 7A:
FIG. 7A is a view illustrating a configuration of a buffer management table in the bridge device.
Figure 7B:
FIG. 7B is a view illustrating an example of data stored in the buffer management table.

FIG. 7A is a view illustrating a configuration of a buffer management table 184. FIG. 7B is a view illustrating an example of data stored in the buffer management table 184. As illustrated in FIG. 7B, a buffer monitor flag F1, an adjustment start threshold H1 (high water mark (HWM) threshold), and an adjustment termination threshold L1 (low water mark (LWM) threshold) are individually set in the buffer management table 184. The buffer monitor flag F1 is an index used when the access monitoring circuit 18 determines whether to monitor the buffer 18a. In more detail, when the buffer monitor flag F1 is set to "1", the access monitoring circuit 18 counts the total number of frames stored in the buffer 18a. Meanwhile, when the buffer monitor flag F1 is set to "0", the access monitoring circuit 18 does not count the total number of stored frames. The buffer monitor flag F1 may be changed as appropriate by the network administrator or carrier, in accordance with the bandwidth or communication rate of the network to which the bridge device 10 is connected, the specifications (for example, memory capacity) of the bridge device 10, the attribute of the frames (length or type of data), or the like.

The adjustment start threshold H1 is an index used when the bridge device 10 determines whether to adjust the access proportions in accordance with the empty entry proportion. In FIG. 7B, the adjustment start threshold H1 is set to 70 frames. Accordingly, when the number of frames stored in the buffer 18a is equal to or more than the adjustment start threshold H1, or 70 frames, the bridge device 10 sets an access control flag F2 to "1", thereby triggering the adjustment of the access proportions in the MAC address table 171. The adjustment termination threshold L1 (for example, 50 frames) is also set in the buffer management table 184. Therefore, once the access proportions start being adjusted, this adjustment continues until the number of stored frames becomes the threshold L1 or less in the buffer 18a. Then, once the number of stored frames reaches the adjustment termination threshold L1 in the buffer 18a, the access control flag F2 is updated to "0", thereby terminating the adjustment of the access proportion in accordance with the empty entry proportion.

In this embodiment, the upper and lower thresholds, which are used to determine whether to adjust the access proportions, are set to 70 and 50, respectively. However, these thresholds may also be changed as appropriate. Specifically, both the adjustment start threshold H1 and the adjustment termination threshold L1 may be updated by the network administrator or carrier, in accordance with the bandwidth, communication rate, or congestion of the network to which the bridge device 10 is connected, the specifications (for example, memory capacity) of the bridge device 10, the attribute of the frames (length or type of data), or the like.

Figure 8:
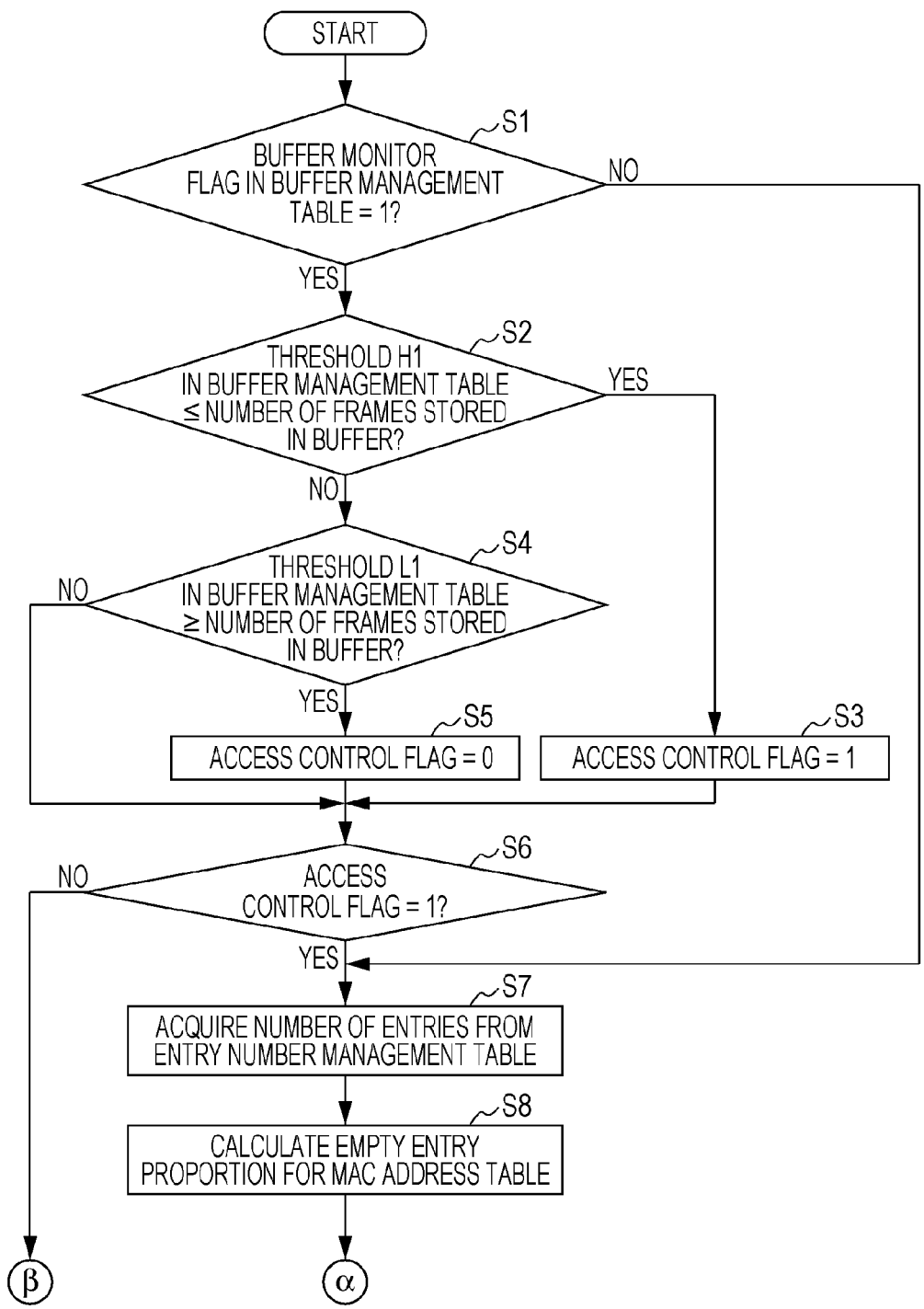
FIG. 8 is an explanatory flowchart of a first operation of the bridge device according to the first embodiment.

Next, an operation of the bridge device 10 will be described. FIG. 8 is an explanatory flowchart of a first operation of the bridge device 10 according to the first embodiment. At S1, first, the access monitoring circuit 18 determines whether or not the buffer monitor flag F1 is set to "1" in the buffer management table 184. If the determination result is that the buffer monitor flag F1 is set to "1" ("Yes" at S1), the access monitoring circuit 18 starts monitoring the buffer 18a. If the monitor result is that the number of frames presently stored in the buffer 18a is equal to or more than the threshold H1 (for example, 70), which is set to start the adjustment of the buffer management table 184 ("Yes" at S2), the access monitoring circuit 18 determines to adjust the access proportions in accordance with the empty entry proportion. In this case, the access monitoring circuit 18 sets the above access control flag F2 to "1" (at S3), thereby triggering the components of the bridge device 10 to start adjusting the access proportions.

Otherwise, if the number of frames presently stored in the buffer 18a is less than the threshold H1 ("No" at S2), the access monitoring circuit 18 compares the number of stored frames with the threshold L1 (for example, 50) that is set to terminate the adjustment of the buffer management table 184. If the comparison result is that the number of stored frames is less than the threshold L1 ("Yes" at S4), the access monitoring circuit 18 determines not to adjust the access proportions in accordance with the empty entry proportion. In this case, the access monitoring circuit 18 sets the above access control flag F2 to "0" (at S5), thereby triggering the components of the bridge device 10 to terminate the adjustment of the access proportions.

Otherwise, at S4, if the number of stored frames exceeds the threshold L1 ("No" at S4), the access monitoring circuit 18 proceeds to a process at S6 without changing the current access control flag F2.

At S6, the access monitoring circuit 18 checks the current access control flag F2. If the access control flag F2 is set to "1" ("Yes" at S6), the access monitoring circuit 18 acquires the current number of entries (for example, 150) from the entry number management table 172 in order to adjust the access proportions, at S7. Meanwhile, if the determination result at S1 is that the buffer monitor flag F1 is set to "0" ("No" at S1), the access monitoring circuit 18 skips the processes at S2 to S6, and acquires the current number of entries from the entry number management table 172, at S7. At S8, the access monitoring circuit 18 calculates a current empty entry proportion for the MAC address table 171, on the basis of the number of entries that has been acquired at S7.

Figure 9:
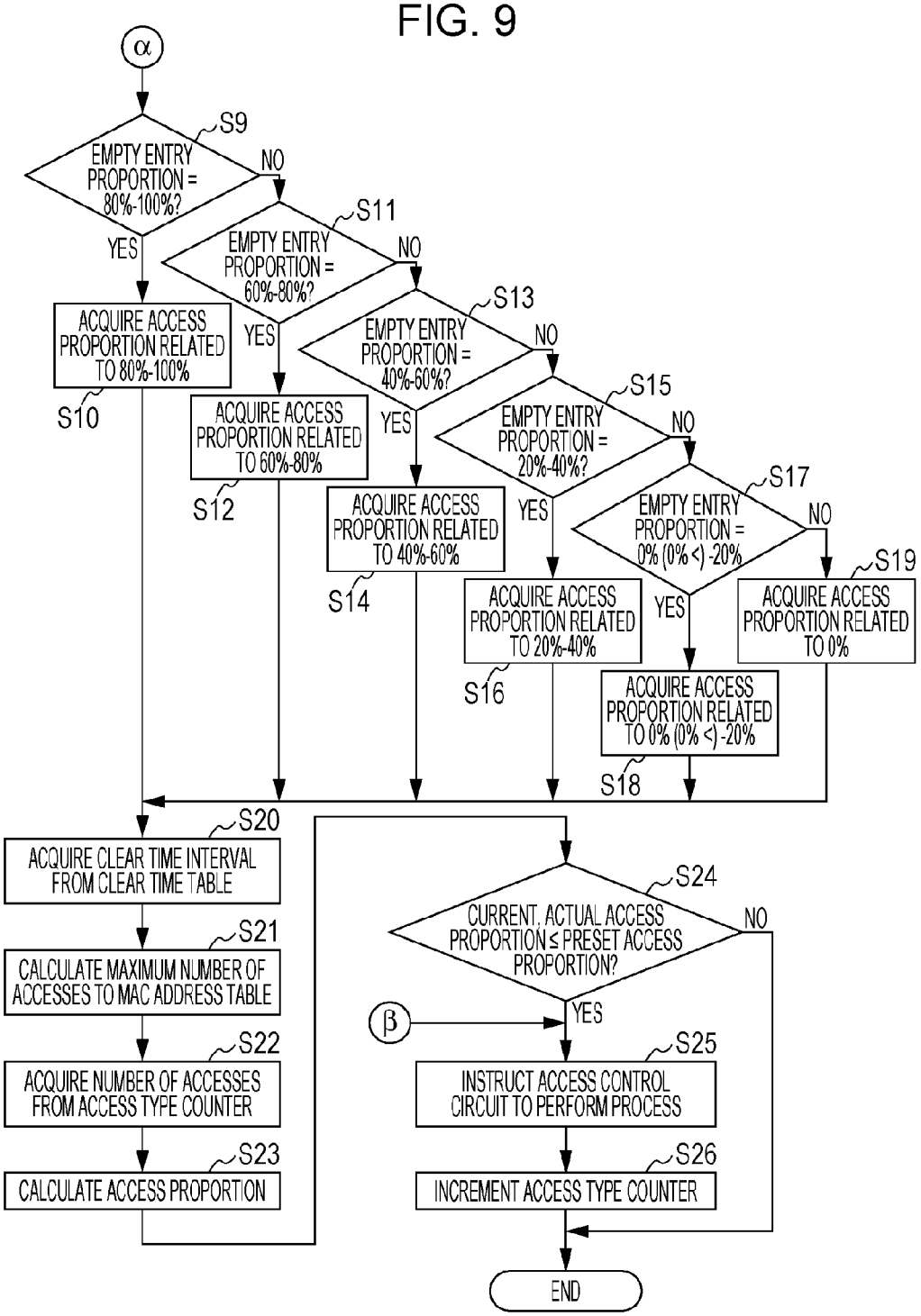
FIG. 9 is an explanatory flowchart of a second operation of the bridge device according to the first embodiment.

FIG. 9 is an explanatory flowchart of a second operation of the bridge device 10 according to the first embodiment. At S9 to S19, the access monitoring circuit 18 acquires, from the access proportion setting table 181, a preset access proportion related to the current empty entry proportion for the MAC address table 171. In more detail, if the empty entry proportion falls within a range of 80% to 100% ("Yes" at S9), the access monitoring circuit 18 refers to the access proportion setting table 181 to acquire preset access proportions related to the above range, at S10 (in FIG. 4B, access proportions of (A), (B), (C) and (D)=10%, 78%, 9% and 3%, respectively). After acquiring the preset access proportions, the access monitoring circuit 18 proceeds to a process at S20.

Likewise, if the empty entry proportion falls within a range of equal to or more than 60% to less than 80% ("Yes" at S11), the access monitoring circuit 18 refers to the access proportion setting table 181 to acquire preset access proportions related to the above range, at S12 (in FIG. 4B, access proportions of (A), (B), (C) and (D)=30%, 60%, 7% and 3%, respectively). If the empty entry proportion falls within a range of equal to or more than 40% to less than 60% ("Yes" at S13), the access monitoring circuit 18 refers to the access proportion setting table 181 to acquire preset access proportions related to the above range, at S14 (in FIG. 4B, access proportions of (A), (B), (C) and (D)=46%, 46%, 5% and 3%, respectively). Furthermore, if the empty entry proportion falls within a range of equal to or more than 20% to less than 40% ("Yes" at S15), the access monitoring circuit 18 refers to the access proportion setting table 181 to acquire preset access proportions related to the above range, at S16 (in FIG. 4B, access proportions of (A), (B), (C) and (D)=64%, 30%, 3% and 3%, respectively).

Likewise, if the empty entry proportion falls within a range of more than 0% to less than 20% ("Yes" at S17), the access monitoring circuit 18 refers to the access proportion setting table 181 to acquire preset access proportions related to the above range, at S18 (in FIG. 4B, access proportions of (A), (B), (C) and (D)=86%, 10%, 1% and 3%, respectively). Moreover, if the MAC address table 171 has no empty entry ("No" at S17), the access monitoring circuit 18 refers to the access proportion setting table 181 to acquire preset access proportions related to an empty entry proportion of 0%, at S19 (in FIG. 4B, access proportions of (A), (B), (C) and (D)=92%, 5%, 0% and 3%, respectively).

After acquiring the access proportions in the above manner, the access monitoring circuit 18 acquires a preset time interval (for example, 1 ms) from the clear time table 182, at S20. At S21, the access monitoring circuit 18 calculates the maximum number of accesses to the MAC address table 171 within the clear time interval, on the basis of a maximum access performance (for example, 15 Mpps) specific to the MAC address table 171, and the clear time interval that has been acquired at S20.

Then, at S22, the access monitoring circuit 18 acquires, from the access type counter 183, the number of accesses to the MAC address table 171 for each of the access types (A) to (D). At S23, the access monitoring circuit 18 determines a proportion of the number of accesses for each access type to the total number of accesses, on the basis of the number of accesses that has been acquired at S22. As a result, a current, actual access proportion for the MAC address table 171 is calculated for each access type. At S24, the access monitoring circuit 18 compares the current, actual access proportion that has been calculated at S23 with the preset access proportion that has been acquired at S10, S12, S14, S16, S18 or S19 for each access type.

If the comparison result at S24 is that the current, actual access proportion is less than the preset access proportion ("Yes" at S24), the access monitoring circuit 18 may determine that the access proportion still falls within the appropriate range even when permitting an access to the MAC address table 171. Therefore, at S25, the access monitoring circuit 18 gives the access control circuit 17 an instruction of performing a process of a corresponding access type. In addition, at S26, the access monitoring circuit 18 increments a counter of the corresponding access type in the access type counter 183 by one, in order to reflect the performing of a process of the permitted access type in the counter. Otherwise, if the current, actual access proportion exceeds the preset access proportion ("No" at S24), the access monitoring circuit 18 may determine that the access proportion is likely to fall outside the appropriate range unless the access is prohibited. For this reason, the access monitoring circuit 18 skips the processes at S25 and S26, and terminates the series of processes without giving the access control circuit 17 an instruction of performing the process of the corresponding access type.

If the access control flag F2 is set to "0" at S6 of FIG. 8 ("No" at S6), the access monitoring circuit 18 determines not to adjust the access proportions in a variable manner, in accordance with the empty entry proportion, thus skipping the processes at S7 to S24. Then, the access monitoring circuit 18 performs the processes at S25 and S26 as described above.

Figure 10:
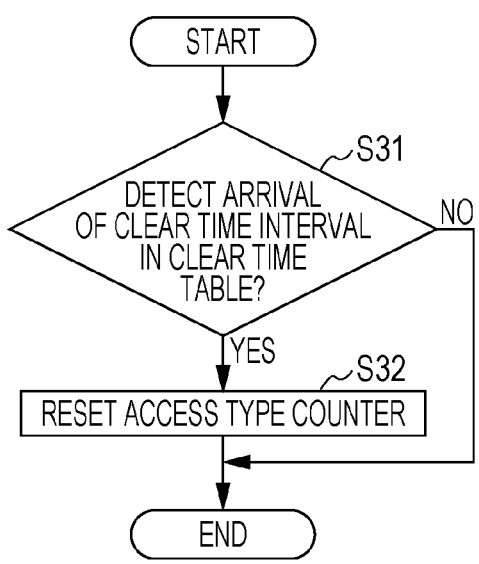
FIG. 10 is an explanatory flowchart of a reset process performed by the access type counter in the bridge device.

In this embodiment, the bridge device 10 updates the access proportions in the MAC address table 171 at regular intervals (for example, 1 ms) as appropriate, in order to promptly keep pace with the change in the empty entry proportion. For this reason, the access monitoring circuit 18 resets the counter of the access type counter 183 to the initial value, or "0", at every clear time interval. FIG. 10 is an explanatory flowchart of a reset process performed by the access type counter 183. At S31, the access monitoring circuit 18 monitors an elapsed time since the initial state or the previous reset. If detecting the arrival of the clear time interval (for example, 1 ms) preset in the clear time table 182 ("YES" at S31), the access monitoring circuit 18 resets the counter of the access type counter 183 at the clear time interval, at S32.

As described above, the bridge device 10 at least includes the MAC address table 171, the access monitoring circuit 18, and the access control circuit 17. The MAC address table 171 stores the sources and destinations of frames. The access monitoring circuit 18 determines the access proportion of each access type in the MAC address table 171, on the basis of an empty state (empty entry proportion) of the MAC address table 171. The access control circuit 17 controls whether to access the MAC address table 171, on the basis of the access proportions (the above preset access proportions) that have been determined by the access monitoring circuit 18 and proportions (the above current, actual access proportions) of accesses that have been made to the MAC address table 171. In more detail, the bridge device 10 adjusts the current, actual access proportion for a corresponding access type, so as to be equal to the access proportion therefor that is determined by the access monitoring circuit 18. For example, the access control circuit 17 accesses the MAC address table 171, if the preset access proportion is more than the actual access proportion. Meanwhile, the access control circuit 17 does not access the MAC address table 171, if the preset access proportion is less than the actual access proportion.

In the bridge device 10, which acts as a communication control device, a storage unit (corresponding to, for example, the MAC address table 171) may be implemented using, for example, an independent device including a hard disk, a read only memory (ROM), a nonvolatile storage device such as a flash memory, and a random access memory (RAM) such as a synchronous dynamic random access memory (SDRAM). Alternatively, the storage unit may be built into the circuit of the bridge device 10. Moreover, a determination unit (corresponding to, for example, the access monitoring circuit 18) may be implemented using, for example, a circuit. Alternatively, the determination unit may be implemented using an independent device such as a field programmable gate array (FPGA), using a processor including a central processing unit (CPU) and a digital signal processor (DSP), or using software controlled by a processor. Likewise, a control unit (corresponding to, for example, the access control circuit 17) may be implemented using, for example, a circuit, an independent device, an FPGA, a processor, or software controlled by a processor.

The bridge device 10 may further include, as optional hardware components, an input device, for example, that enables the administrator to preset and update the access proportions in accordance with the empty entry proportion, and a display device, for example, that enables the administrator to check preset or current, actual access proportions. Examples of the input device may include, but are not limited to, a keyboard, a mouth, and a touch panel, and examples of the display device may include, but are not limited to, a liquid crystal display (LCD) and an electro luminescence display (ELD).

In the bridge device 10, the access monitoring circuit 18 may determine the access proportion used to retrieve a destination of a frame from the MAC address table 171 (or the access proportion for the MAC DA retrieval), on the basis of the number of destinations of frames stored in the MAC address table 171, namely, the volume of MAC learning stored therein. Specifically, the access monitoring circuit 18 may determine the access proportion, such that as the number of sources of frames stored in the MAC address table 171, namely, the volume of MAC learning stored therein is decreased, the access proportion of the access to retrieve destinations of frames from the MAC address table 171 is decreased. Consequently, the bridge device 10 controls the access proportion, in such a way that when the volume of the MAC learning decreases, the access proportion of the MAC DA retrieval is decreased, whereas when the volume of the MAC learning increases, the access proportion of the MAC DA retrieval is increased.

As described above, the bridge device 10 allows the access proportions of the access types in the MAC address table 171 to be set through an external unit. In addition, the bridge device 10 allows the current, actual access proportions to be continuously monitored through, for example, an external monitor. These functions make it possible to appropriately adjust the access proportions in accordance with an operational configuration of a network to which the bridge device 10 is connected, even during the operation of the bridge device 10.

The bridge device 10 according to this embodiment successfully increases the efficiency of memory access, without placing a heavy load on the memory. Thus, the bridge device 10 achieves frequent accesses to the memory over a wide area network of, for example, approximately 100 Gbps, even when a relatively low-cost memory is used. This makes it possible to accept many requests for accessing the memory while suppressing a cost increase of the memory. Moreover, the bridge device 10 also achieves frequent accesses to the memory over a wide area network, even when an access speed of a memory is relatively low. This makes it possible to accept many requests for accessing the memory while suppressing an increase in power consumption and heat generation of the memory.

The bridge device 10 according to this embodiment is effectively available, especially when the MAC address table 171 is implemented using a memory (for example, a ternary content addressable memory (TCAM), a static random access memory (SRAM), or a dynamic random access memory (DRAM)) that has an insufficient access performance (for example, insufficient MAC learning performance). Here, an access performance requested for a bridge function is calculated by the following equation (1), where an input rate of a frame is denoted by "X packets per second (pps)."

$$\text{Requested access performance} = (\text{MAC DA retrieval performance} + \text{MAC SA retrieval performance} + \text{MAC learning performance}) + \text{aging performance} = 3X + (\text{number of entries to MAC address table/minimal aging time}) \quad (1)$$

The increasing frame rate of data tends to increase the frequency of accesses to a memory that has the MAC address table 171. In order to follow this tendency, it is effective to improve the performance of the memory itself. Unfortunately, a memory that satisfies a requested access performance is, in general, expensive and exhibits high power consumption and heat generation due to its high access speed property. However, the bridge device 10 according to this embodiment achieves the dynamic adjustment of the access performance by setting the respective access proportions of the access types (A), (B), (C) and (D) in the MAC address table 171 in a variable manner, on the basis of the empty entry proportion for the MAC address table 171. With this function, the efficiency of the memory access is increased, so that the performance requested for the memory is relaxed. In other words, using the bridge device 10 adapts the memory to the increasing communication rate, without increasing the access speed of the memory itself, thereby suppressing a cost increase and power consumption of the memory.

For example, when the empty entry proportion for the MAC address table 171 is as high as 80% to 100% and MAC learning has a low volume, almost all frames that the bridge device 10 receives are not generally hit through the MAC DA retrieval. As a result, these frames are flooded (for example, broadcasted). In other words, even when the MAC retrieval is performed while the volume of MAC learning is low, a desired MAC DA is less likely to be found. This results in inefficient accessing. Therefore, in order to increase the efficiency of the accesses to a memory, it is desirable for the bridge device 10 to decrease the access proportion of the MAC DA retrieval and in turn increase the number of accesses for the MAC SA and the MAC learning.

Meanwhile, for example, when the empty entry proportion of the MAC address table 171 is as low as 0% to 20% and MAC learning has a low volume, there are only a few empty entries in the MAC address table 171. For this reason, even when the MAC address of a frame that the bridge device 10 receives is not registered in the MAC address table 171, the MAC learning of this frame is less likely to be performed in the MAC address table 171, due to the limited memory capacity. In addition, the MAC address of the received frame is likely to be already registered in the MAC address table 171. Accordingly, in this situation, it is desirable for the bridge device 10 to decrease the access proportion for the MAC SA retrieval and the MAC learning and in turn increase the number of accesses for the MAC DA retrieval, so that the efficiency of accesses to the memory is increased.

As for the aging, since its interval is generally approximately 10 sec to 5 sec, it does not have to set the frequency of accesses for the aging to much higher than that for any other access type. However, the bridge device 10 has to continuously assign a predetermined access proportion (for example, 3% or more) to the aging, in order to reliably delete entry information from the MAC address table 171. Specifically, it is sufficient for the bridge device 10 to set the access proportion of the aging to a minimum (for example, 3%) within a range in which an entry is reliably deleted at a predetermined frequency. By decreasing the access proportion of the aging, the bridge device 10 is able to increase the access proportion of any other access type. The access proportion of the aging may be a fixed value (for example, 3%) that is independent of the empty entry proportion of the MAC address table 171, or may be changed depending on the empty entry proportion. For example, when the empty entry proportion is low and therefore an empty memory capacity is limited, the bridge device 10 may set the access proportion of the aging to a lower value (for example, 3%). In contrast, when the empty entry proportion is high and therefore a sufficient empty memory capacity is reserved, the bridge device 10 may set the access proportion of the aging in a variable manner. For example, it may be set to a higher value (for example, 5% to 7%).

The bridge device 10 according to this embodiment may monitor the accesses to the MAC address table 171 through the buffer 18a before controlling the access proportions in a variable manner. When no frame is stored in the buffer 18a, the bridge device 10 does not have to monitor accesses performed due to the access types (A) to (D). In contrast, when any frame is stored in the buffer 18a, it is preferable for the bridge device 10 to monitor the accesses. On the other hand, when determining whether to control the access proportions in a variable manner, on the basis of the empty entry proportion, the bridge device 10 may employ a dual-threshold control method, which involves using lower and higher thresholds. In this method, the bridge device 10 keeps controlling the access proportions in a variable manner, as long as the number of frames stored in the buffer 18a falls within a range between the thresholds L1 and H1. With this method, the occurrence of chattering is suppressed when the control of the access to each table starts or ends, thereby making the adjustment of the access proportions more stable.

Second Embodiment

Figure 11:
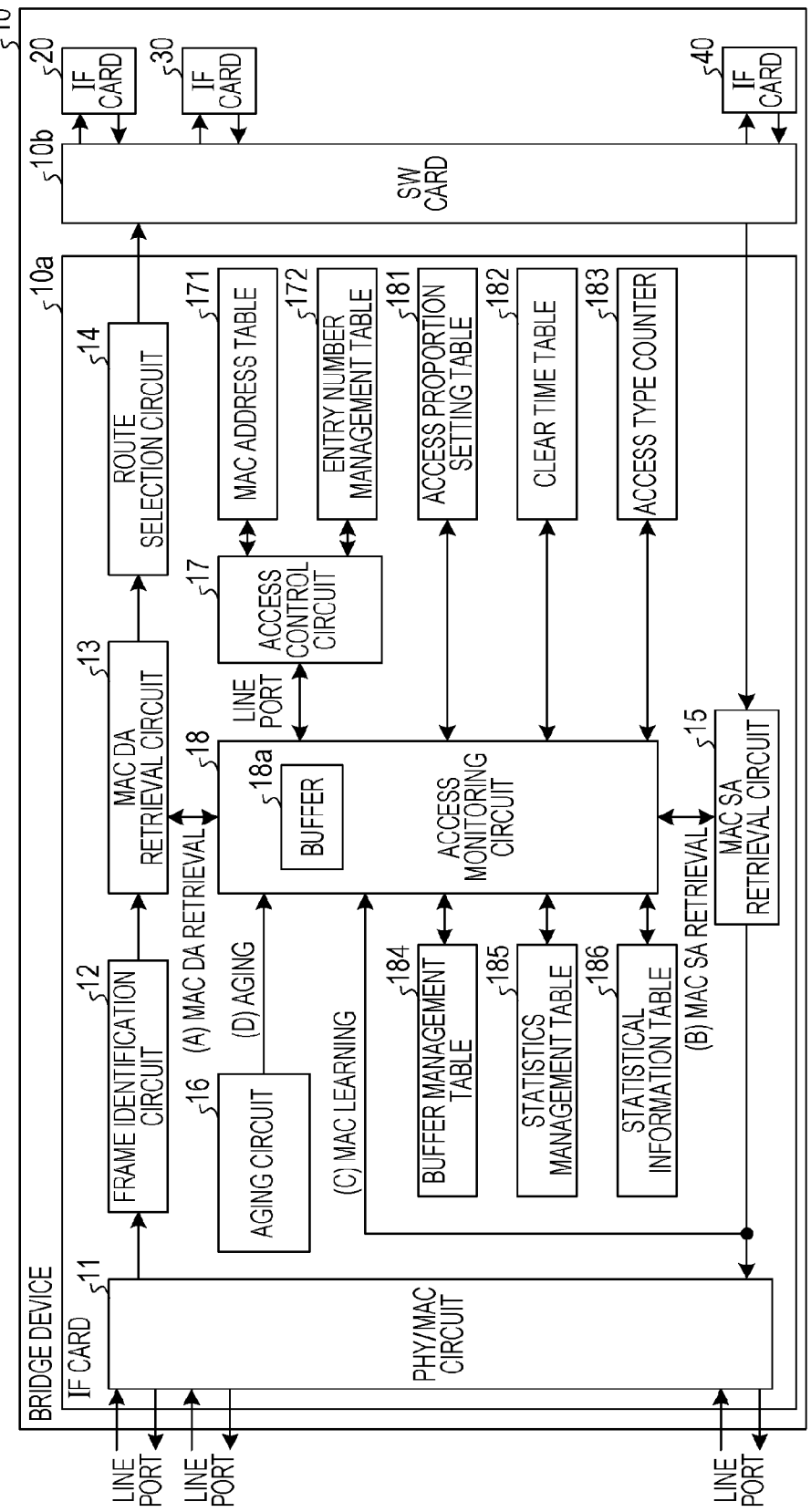
FIG. 11 is a block diagram illustrating a configuration of a bridge device according to a second embodiment.

Next, the second embodiment will be described. FIG. 11 is a block diagram of a configuration of a bridge device according to the second embodiment. As illustrated in FIG. 11, a bridge device 10 according to the second embodiment has the same configuration as the bridge device 10 according to the first embodiment as illustrated in FIG. 1 does, except for that a statistics management table 185 and a statistical information table 186 are newly provided. Therefore, the common components are given the same reference numerals and a detailed description thereof will be omitted. The second embodiment differs from the first embodiment, in that the bridge device 10 collects statistical information while the access control circuit 17 is accessing the MAC address table 171 or not accessing it. As illustrated in FIG. 11, the bridge device 10 counts the number of accesses to the MAC address table 171 and the number of non-accesses thereto for each access type by using the statistics management table 185 and the statistical information table 186, and collects this result, as statistical information.

FIG. 12A is a view illustrating a configuration of the statistics management table 185. FIG. 12B is a view illustrating data stored in the statistics management table 185. As illustrated in FIG. 12B, the statistics management table 185 is composed of a single entry, and a statistics collection flag F3 is set therein. The statistics collection flag F3 is an index used when the bridge device 10 determines whether to collect the statistical information. In more detail, when the statistics collection flag F3 is set to "1", the access monitoring circuit 18 collects the statistical information. Meanwhile, when the statistics collection flag F3 is set to "0", the access monitoring circuit 18 omits the collection of the statistical information.

FIG. 13A is a view illustrating a configuration of a statistical information table 186. FIG. 13B is a view illustrating data stored in a statistical information table 186. As illustrated in FIG. 13B, the statistical information table 186 is composed of four entries, and the number of accesses and the number of non-accesses for each process type are retained therein, as statistics counters. The term "the number of accesses" indicates the number of times (a measurement) in which the access control circuit 17 has actually accessed the MAC address table 171 in accordance with an access permission from the access monitoring circuit 18. The term "the number of non-accesses" indicates the number of times (a measurement) in which the access control circuit 17 has not accessed the MAC address table 171 in accordance with an access denial from the access monitoring circuit 18, when an access for any access type is requested.

Figure 14:
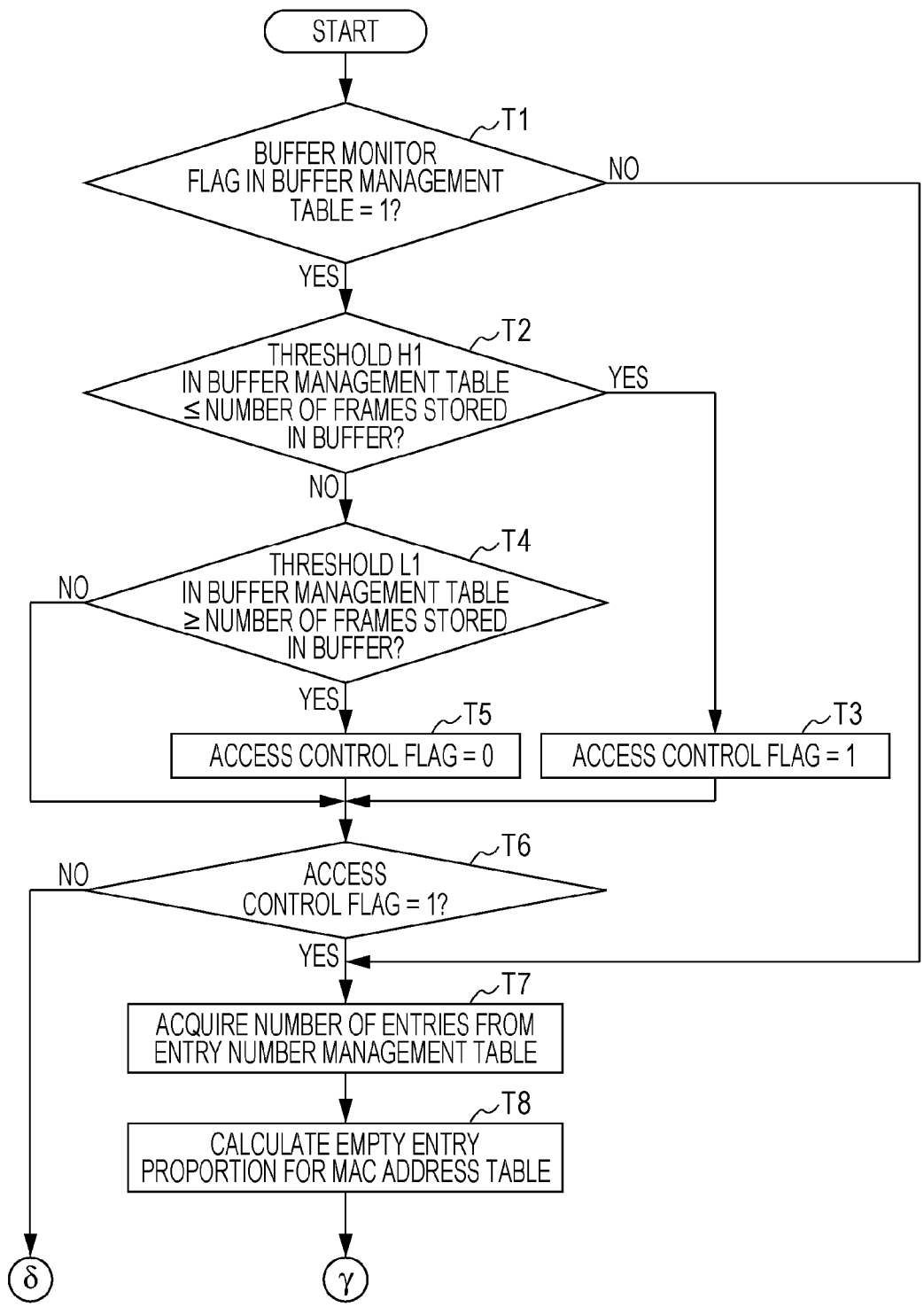
FIG. 14 is an explanatory flowchart of a first operation of the bridge device according to the second embodiment.
Figure 15:
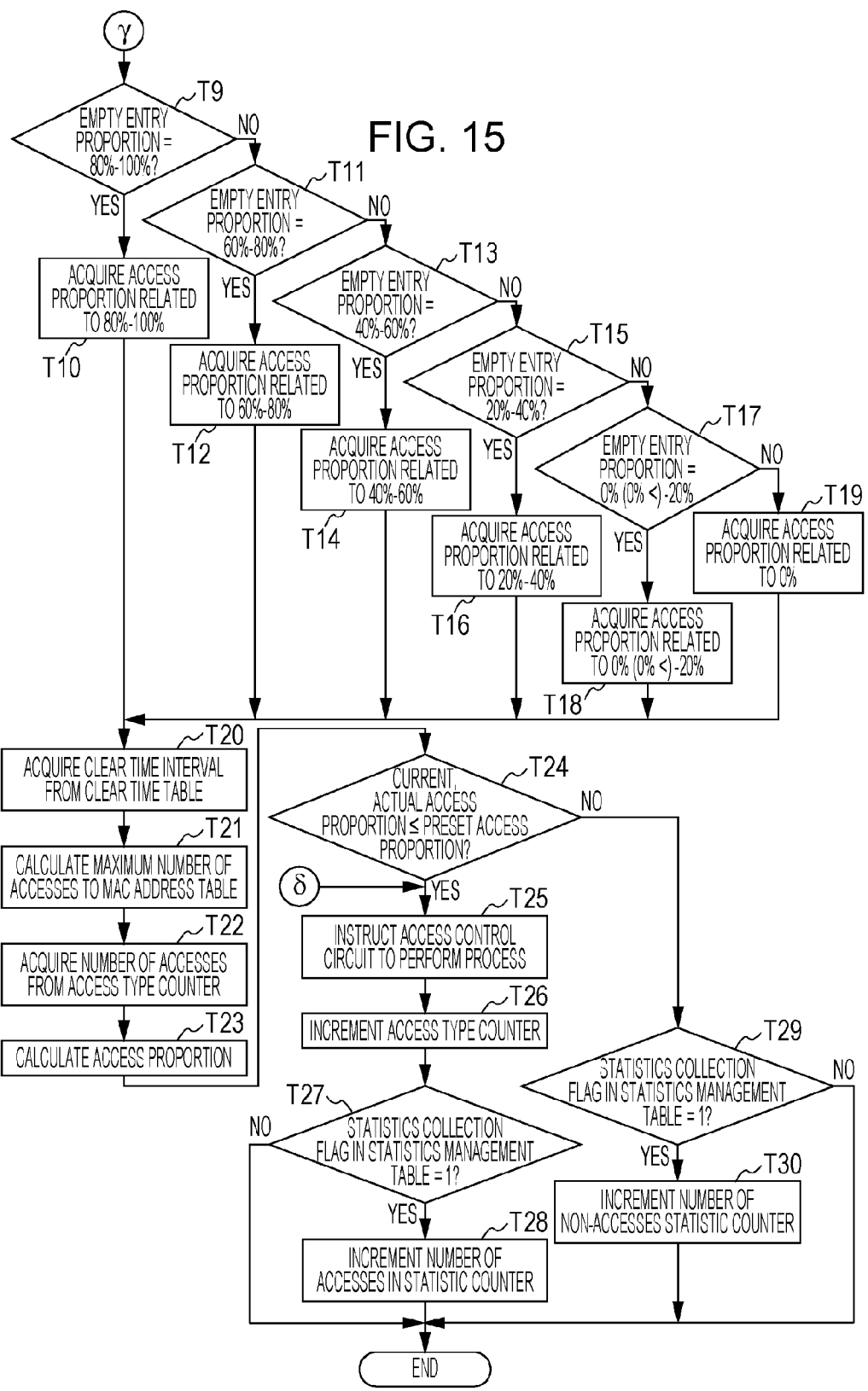
FIG. 15 is an explanatory flowchart of a second operation of the bridge device according to the second embodiment.

An operation of the bridge device 10 according to the second embodiment will be described. Hereinafter, an operation of the bridge device 10 according to the second embodiment will be described by focusing differences from the operation of the bridge device 10 according to the first embodiment, with reference to FIGS. 14 and 15. FIG. 14 is an explanatory flowchart of a first operation of the bridge device 10 according to the second embodiment. Since the flowchart of FIG. 14 has the same processes as that of FIG. 8 does which describes the first operation of the first embodiment, the same last digits are assigned to operations common to both the first and second embodiments, and a detailed description thereof will be omitted. FIG. 15 is an explanatory flowchart of a second operation of the bridge device 10 according to the second embodiment. Since the flowchart of FIG. 15 is similar to that of FIG. 9 which describes the second operation of the second embodiment, the same last digits are assigned to operations common to both the first and second embodiments, and a detailed description thereof will be omitted. Specifically, operations T1 to T8 in FIG. 14 correspond to operations S1 to S8 in FIG. 8, respectively. In addition, processes at operations T9 to T26 in FIG. 15 are the same as those at operations S9 to S26 in FIG. 9, respectively.

At T27, the access monitoring circuit 18 refers to the statistics management table 185, and determines whether or not the statistics collection flag F3 is set to "1" in the statistics management table 185. The determination result is that the statistics collection flag F3 is "1" ("Yes" at T27), the access monitoring circuit 18 increments the number of accesses in a current statistic counter of a corresponding access type in the statistical information table 186 by "1", in order to reflect the performing of the process of the access type in the statistical information, at T28. Otherwise, the statistics collection flag F3 is "0" ("No" at T27), the access monitoring circuit 18 skips the process at T28, and terminates the series of access proportion adjustment processes without collecting any statistical information.

At T29 and T30, the access monitoring circuit 18 performs the same processes as those at T27 and T28, respectively, in response to the determination result in which the current, actual access proportion exceeds the preset access proportion ("No" at T24). In more detail, at T29, the access monitoring circuit 18 determines whether or not the statistics collection flag F3 is set to "1" in the statistics management table 185. The determination result is that the statistics collection flag F3 is "1" ("Yes" at T29), the access monitoring circuit 18 increments the number of non-accesses in the current statistics counter of the corresponding access type by "1", at T30. Otherwise, the statistics collection flag F3 is "0" ("No" at T29), the access monitoring circuit 18 skips the process at T30, and terminates the series of processes.

In the second embodiment, the reset process (see FIG. 10) is also performed at every clear time interval, similar to the first embodiment.

The bridge device 10 according to the second embodiment at least includes the access monitoring circuit 18 and the access control circuit 17, as described above. The access monitoring circuit 18 counts the number of times in which accesses to the MAC address table 171 are permitted and the number of times in which accesses thereto are denied, for each of the access types (A) to (D). Subsequently, the access control circuit 17 controls the accesses to the MAC address table 171, on the basis of the number of accesses and the number of non-accesses which are counted by the access monitoring circuit 18. For example, the access monitoring circuit 18 may permit accesses for an access type more frequently in which the number of accesses is much smaller than the number of non-accesses, thereby increasing the total number of times in which the access control circuit 17 accesses the MAC address table 171. In addition, the access monitoring circuit 18 may deny accesses for an access type more frequently in which the number of accesses is much larger than the number of non-accesses, thereby increasing the number of non-accesses for this access type and decreasing the total number of times in which the access control circuit 17 accesses the MAC address table 171.

As described above, the bridge device 10 according to the second embodiment counts the number of accesses to the MAC address table 171 and the number of non-accesses thereto, in addition to controlling and changing the access proportions in accordance with the empty entry proportion. Since counting the number of accesses for each access type that is a purpose of an access, the bridge device 10 may reset the access proportions to new ones, on the basis of the counter. To give an example, it is assumed that the number of accesses is "3000" and the number of non-accesses is "5000" for (A) MAC DA retrieval, as illustrated in FIG. 13B, namely, the number of accesses is much larger than the number of non-accesses, for (A) MAC DA retrieval. In this example, the administrator may reset the access proportion of the MAC DA retrieval, as by increasing this access proportion, in order to suppress the decrease in the number of MAC DA retrievals. To give another example, it is assumed that the number of accesses is "8000" and the number of non-accesses is "1000", for (B) MAC SA retrieval. In this example, the administrator may reset the access proportion of the MAC SA retrieval, as by decreasing this access proportion, in order to suppress the excessive increase in the number of accesses. In this manner, the statistical information may be utilized.

In the first and second embodiments as described above, the bridge device 10 adjusts the accesses to the MAC address table 171 by using hardware. However, this adjustment may be made by using software (for example, a policer). The target that the bridge device 10 registers (learns) and deletes is the source of a frame retrieved through the MAC SA retrieval; however it may also be the destination of a frame retrieved through the MAC DA retrieval. Moreover, in the embodiments, a bridge device, which is a network apparatus for the data link layer, is given as an example of an object that adjusts the access proportions on the basis of the empty entry proportion in the MAC address table 171. However, the embodiments are applicable to any other network apparatus with a memory, such as a hub, a repeater, a router, a gateway, or a switch, regardless of layer. Furthermore, the embodiments are applicable to any protocol data unit (PDU) as a frame, such as packets for the transmission control protocol/internet protocol (TCP/IP), or cells for the asynchronous transfer mode (ATM).

In the first and second embodiments, the MAC address table 171 has the four access types: (A) MAC DA retrieval, (B) MAC SA retrieval, (C) MAC learning, and (D) aging. However, there is no limitation on the access types, as long as the MAC address table 171 has two or more types. Moreover, there is no limitation on the purpose of the accesses to the MAC address table 171. Examples of the purpose may include, but are not limited to, storing and deleting the destinations of frames, displaying and modifying the destinations and sources of frames, in addition to retrieving, storing (registering) and deleting the sources of frames.

In the bridge device 10 according to the first and second embodiments, the buffer management table 184 manages all the received frames in the buffer 18a, regardless access type. However, the determination whether to monitor the buffer 18a or to adjust the access proportions in a variable manner may be made for each access type, similar to adjusting the access proportions. In this case, although the bridge device 10 has to set the adjustment start threshold H1 and the adjustment termination threshold L1 for each of the access types (A) to (D), it is achieved that the buffer 18a is flexibly managed in accordance the change in the communication environment.

The empty entry proportion and each access proportion, as described above, may be substituted by the number of empty entries and the number of accesses, respectively. In the first and second embodiments, the bridge device 10 sets each empty entry proportion in multiple stages; however may set it in a continuous or linear fashion, in order to adjust the access proportion more finely. Furthermore, the empty entry proportion is set in six stages in steps of 20%. However, there is no limitation on the setting of the empty entry proportion. Alternatively, the empty entry proportion may be set, for example, in five stages in steps of 25% or in eleven stages in steps of 10%. In addition, the empty entry proportion may not be separated into multiple stages evenly. Alternatively, the empty entry proportion may not be separated unevenly, for example, such that: a range of 0% to 40%, in which a large number of entries are registered, is separated in the steps of 20%; a range of 40% to 80%, in which a small number of entries are registered, is separated in the steps of 10%; and a range of 80% to 100%, in which a further smaller number of entries are registered, is separated in the steps of 5%. Separating the empty entry proportion unevenly in this manner enables the entry proportion to be managed in accordance with the empty entry proportion more efficiently and more flexibly.

In the first and second embodiments, the access proportions in the access proportion setting table 181, the clear time interval in the clear time table 182, and the thresholds in the buffer management table 184 are set or updated by a manual operation of, for example, the network administrator. However, they may be automatically set or updated in the bridge device 10. In this case, the bridge device 10 may set or update the access proportions, the clear time interval, the thresholds, and the like by utilizing the acquired statistical information. The adjustment in this manner makes the access control using the access proportion more suitable for the situation, by assessing or feeding back the result of the statistics management. Consequently, it is possible for the bridge device 10 to control the accesses more precisely, on the basis of the access proportions that are set with high precision, thereby achieving the highly reliable access control.

In the first and second embodiments, the components of the bridge device 10 may not be physically identical to those in the drawings. Thus, there is no limitation on specific separation or integration of the individual components. Specifically, each of the individual components may be physically or functionally separated or some of them may be physically or functionally integrated, in accordance with the state of a load, usage or the like. For example, the access monitoring circuit 18 and the access control circuit 17, the MAC DA retrieval circuit 13 and the MAC SA retrieval circuit 15, or the tables 171, 172, 181, 182 and 184 may be integrated as a single component. Meanwhile, the access monitoring circuit 18 may be separated into a part of adjusting the access proportion and a part of managing the buffer 18a. The access control circuit 17 may be separated into a part of retrieving, registering, and deleting addresses, and a part of instructing the subtraction of the number of entries. The memory that retains the above tables and counter may be implemented using an external device, and be connected to the bridge device 10 through a network or a cable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A communication control device comprising:
a storage unit configured to store source addresses and destination addresses of one or more frames;
a determination unit configured to determine respective access proportions for types of accesses to the storage unit, in accordance with an empty state of the storage unit, the empty state being a proportion of the number of empty entries in the storage unit to the total number of entries; and
a control unit configured to control whether to access the storage unit, based on the access proportions determined in accordance with an empty state of the storage unit by the determination unit and proportions for accesses having been made to the storage unit.
2. The communication control device according to claim 1, wherein the determination unit determines the access proportion used to retrieve the destination address of the frame from the storage unit, based on the number of source address of frames stored in the storage unit.
3. The communication control device according to claim 2, wherein the determination unit determines the access proportion, so that the access proportion used to retrieve the destination address of the frame from the storage unit is decreased, as the number of source address of the frames stored in the storage unit is decreased.

4. The communication control device according to claim 1, wherein:
- the determination unit counts the number of accesses in which an access to the storage unit is permitted and the number of non-accesses in which an access to the storage unit is denied, for each of the types of accesses, and
- the control unit controls whether to access to the storage unit, based on the number of accesses and the number of non-accesses which are counted by the determination unit.

5. A communication control method performed by a communication control device, comprising:
- determining respective access proportions for types of accesses to a storage unit, in accordance with an empty state of the storage unit, the storage unit storing source addresses and destination addresses of frames, the empty state being a proportion of the number of empty entries in the storage unit to the total number of entries; and
- controlling whether to access the storage unit, based on the access proportions determined in accordance with an empty state of the storage unit and proportions for accesses having been made to the storage unit, executed by a processor.

* * * * *